UNITED STATES PATENT OFFICE.

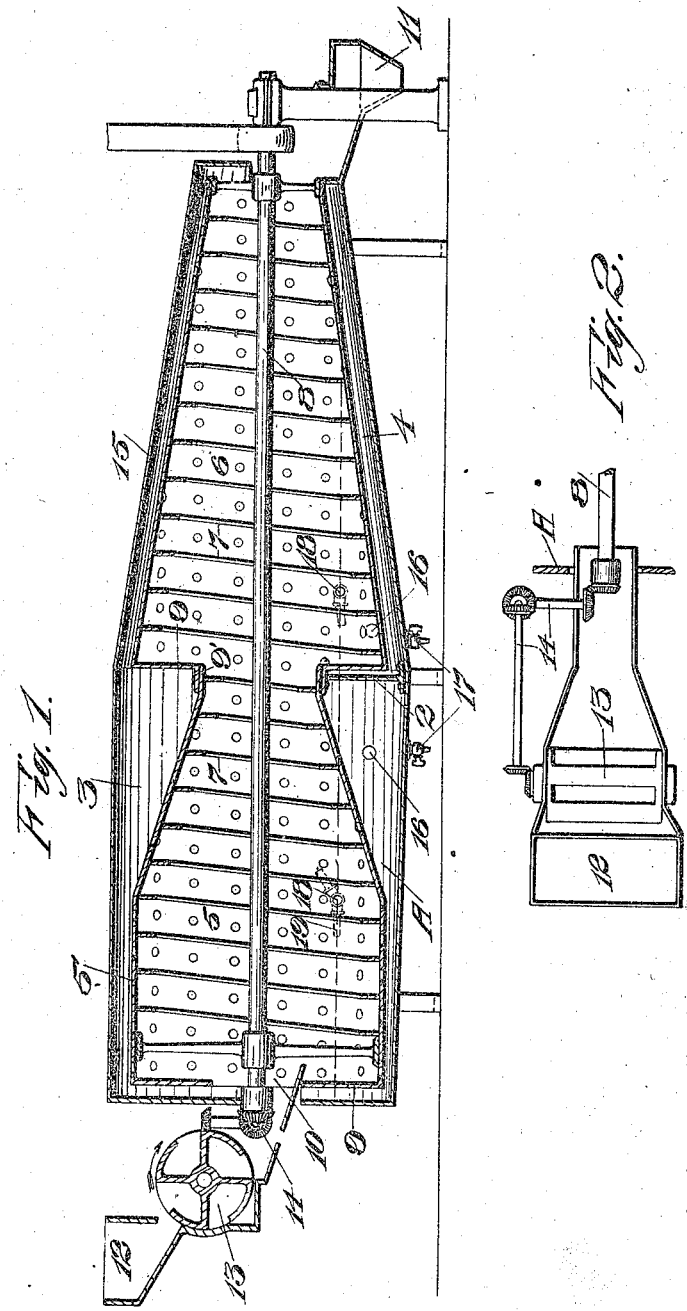

EDWARD J. JUDGE AND LOYD C. DIBERT, OF SAN FRANCISCO, CALIFORNIA.

SCALDER AND WASHER.

No. 847,781.　　　　　Specification of Letters Patent.　　Patented March 19, 1907.

Application filed September 14, 1905. Serial No. 278,375.

*To all whom it may concern:*

Be it known that we, EDWARD J. JUDGE and LOYD C. DIBERT, citizens of the United States, residing in the city and county of San Francisco and State of California, have invented new and useful Improvements in Scalders and Washers, of which the following is a specification.

Our invention relates to apparatus for scalding and washing fruit and vegetables preliminary to canning.

The object of our invention is to provide a simple practical machine for passing fruits and vegetables—like tomatoes, peas, peaches, &c.—through a bath or baths of hot water or hot solution to remove or loosen the skins preparatory to canning with as little damage to the fruit or vegetables as possible. The trouble with most machines now in use is that the fruit is tumbled about too much and bruised or crushed in its passage through the scalder.

It consists of the parts and the construction and combination of parts, as hereinafter more fully described and claimed, having reference to the accompanying drawings, in which—

Figure 1 represents a longitudinal section of our machine with the feed-delivery trough broken away and the feeder moved up close to tank. Fig. 2 is a plan of the feeder, showing connections with main shaft.

A represents a tank suitably supported and of any appropriate size, shape, or material. We usually make the tank of heavy sheet metal with a half-round bottom and divide the tank transversely into two compartments by the partition 2—one compartment, as 3, for the hot water for the preliminary heating and the other, 4, to contain the hot solution for removing the skins, &c.

The respective compartments are provided with the peculiarly-shape conveyers 5 6. Each conveyer comprises a conical shell having suitable perforations for the free passage of the liquid in and out of the shell and having the internal spiral flange 7. The perforations are of such size as to prevent the passage through them of the smallest size fruit under treatment. Both shells are mounted to rotate on the same horizontal axis and are shown as carried on the shaft 8. The base or larger end of each shell is toward the rear or feed end of the machine. Each shell is partly closed at the base end by an annular flange or head 9, and the smaller end of the rearmost shell 5 is secured to the base flange or head of the advance shell 6, with the opening in the head of the latter coinciding with the discharge-opening at the smaller end of the rear shell.

The internal spiral rib or flange 7 acts when a shell is turned to advance the material by rolling it over and over without any tendency to rubbing and bruising or crushing of the material on the sides of the case, as is liable to happen when a stationary case and an ordinary worm are used. The fruit, especially after immersion and heating, is very tender and must be handled as gently as possible, so as not to impair its merchantable quality.

Delivery is made into the machine through the central opening 10 in the base-flange of the rear shell 5.

The conveyers being set in motion, the material is advanced from the wider end of the first conveyer up the incline and dumped into the rear wider end of the second conveyer, thence lifted again, and finally discharged from the smaller elevated end of this conveyer into the hopper 11 and upon the washing-tables or otherwise, as desired.

Any suitable means may be employed to rotate the conveyers.

If a somewhat prolonged action of the water or solution is desired on the material undergoing treatment, one or the other, or both, of the conveyers may be provided with a suitable horizontal cylindrical portion, as 5', which is also supplied with the internal spiral flange. Inasmuch as the shell is designed to be more or less submerged, this causes the material to travel a longer distance through the liquid before being lifted up the inclined tapered portion of the shell. As the material clears the body of the solution the liquid drains off through the perforations in the shell and back into the compartment where it belongs. The material may be conveyed successively through as many tanks and as many different solutions as desired or necessary, since the tank may be of any length and there may be any number of assembled conveyers acting one after the other and successively to advance the fruit, submerge it, lift it clear of the solution, drain it, and pass it on to a succeeding conveyer. While we have shown two conveyers on the same shaft and operating successively and through different solutions, it is obvious that under some conditions we may employ only a single solution and a single conveyer, the principle of operation being the same.

Where a plurality of conveyers are used, as shown, the head 9 of the conveyer in advance has an outwardly-projecting annular flange 9', surrounding the central opening in the head to which the reduced end of the conveyer immediately in rear is riveted or otherwise attached. Connecting the conveyers in some such way as this insures the delivery from one to the other in the manner desired.

By employing a conical rotary perforated shell with an internal spiral flange, as here shown, the fruit or vegetables are given the necessary movement through the bath and are also lifted clear of and drained of the solution, the fruit being given a rolling motion in the constantly-revolving shell, rather than being pushed along over and up a hard unyielding surface and incline. In our apparatus the fruit simply travels with the conveyer itself and is subjected to a minimum amount of rough usage. The necessary submersion and horizontal movement of the fruit through the liquid and its lifting and draining is done by the one agency or element—to wit, the conical rotary perforate shell and its internal spiral.

To secure best results, the fruit or vegetables should be fed uniformly into the machine. At least the charges should be regulated, so as to limit the amount the machine is to handle at any one time. Where operating continuously in big factories, we prefer to regulate the feed so that it is made to correspond to the rate of rotation of the conveyers.

At the rear or feed end of the apparatus we have shown a chute or trough 12, into which the fruit or other material in proper shape for treatment is dumped or delivered. Suitably disposed in this trough is a rotary feeder having the peripheral pockets 13. Each pocket is adapted to contain a predetermined amount proportioned to the requirement and capacity of the conveyer. The feeder is given a coördinate movement with the conveyers by suitable connections 14 between the shaft of the feeder and the shaft 8, Fig. 2. The axis of the feeder is placed below the level of the runway on which the fruit in bulk is supported, and the feeder revolves in the direction of the arrow, so that each pocket will fill as it comes up on one side and dump into the machine as it goes down on the other. By gearing or otherwise connecting the feeder and conveyers the two operate in unison. If the conveyers are run faster, the feed will be faster, and vice versa.

If desired, the conveyer may be entirely inclosed by a cover 15 to keep in the heat and fumes.

The liquid in the two compartments may be kept hot by admitting steam through suitable connections 16, and the compartments may be drained through the valved outlets 17.

Each compartment is provided with an overflow, which preferably consists of an elbow 18, turning on a nipple on the tank, and a short section of pipe 19, screwing into the elbow. By turning the elbow on its nipple the end of the section 19 may be raised or lowered to vary within certain limits the level of the liquid in the compartment.

It is possible that various modifications in our invention may be made without departing from the principle thereof, and we do not wish to be understood as limiting ourselves to the specific construction as herein shown and described.

Having thus described our invention, what we claim, and desire to secure by Letters Patent, is—

1. A scalder comprising a substantially closed containing-tank having a transverse partition dividing its interior into a hot-water compartment and a hot-solution compartment, and a foraminous shell of double-cone form having the smaller end of one cone connected to the larger end of the other cone at a point above the level of the solution therein, each of said cones revolubly mounted in one of the compartments of the tank and having a spiral conveyer and one of said cones delivering its contents into the other cone.

2. A scalder comprising a liquid-containing tank; a hollow foraminous drum revolubly mounted therein and having one portion submerged in the liquid contents thereof, said drum having an internal conveyer, and an overflow-pipe having an adjustable nipple turnable in a vertical plane to vary the height of the liquid-level.

In testimony whereof we have hereunto set our hands in presence of two subscribing witnesses.

EDWARD J. JUDGE.
LOYD C. DIBERT.

Witnesses:
S. H. NOURSE,
D. B. RICHARDS.